May 23, 1933.   J. LESSIG   1,910,299
MULCHER
Filed May 31, 1932
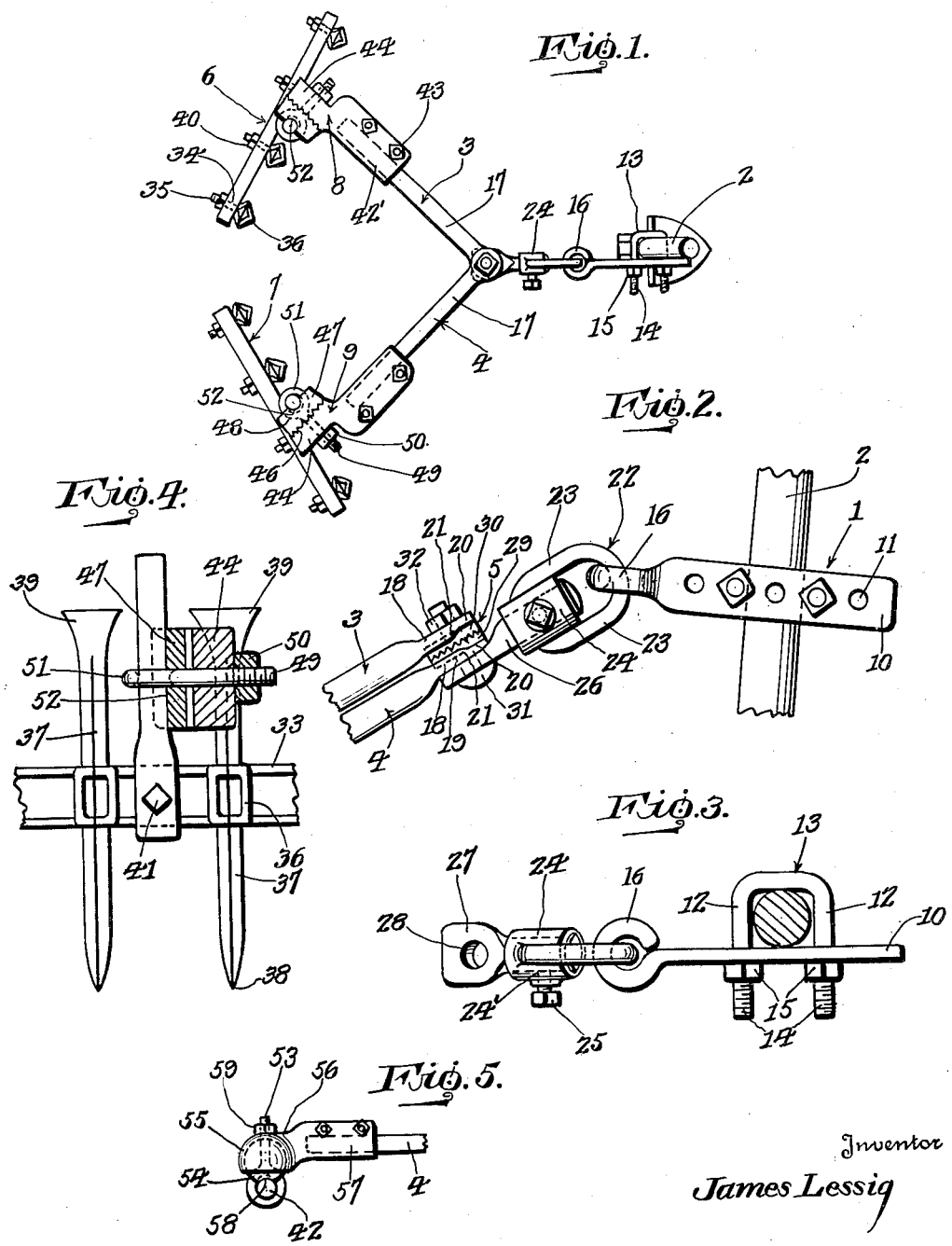
Inventor
James Lessig
By Geo. P. Kimmel
Attorney Patented May 23, 1933

1,910,299

UNITED STATES PATENT OFFICE

JAMES LESSIG, OF AINSWORTH, NEBRASKA

MULCHER

Application filed May 31, 1932. Serial No. 614,536.

This invention relates to a mulcher for attachment to and following a cultivating means for row crops, and has for its object to break up the ridges left by the shovels or teeth of the cultivating means and to prepare a mulch of the ground behind the latter.

It is well known that cultivators leave a ridge between the teeth thereof, and it will be found upon examination that these ridges are hard, firm, untilled soil, and further that the soil is not cultivated in the ridge, with the exception at the top thereof. This compact, hard turned ridge of soil permits the escape of moisture from the ground, and in some instances it packs and becomes hard and cannot be pulverized by the ordinary cultivator. To overcome the foregoing objections is the aim of a mulcher, in accordance with this invention, and by its use it turns up the ridges referred to and loosens all the soil behind the shovels and leaves the soil in a loose mellow condition, as well as assisting in the conservation of moisture and destruction of weeds.

Further objects of the invention are to provide, in a manner as hereinafter referred to, a mulcher for the purpose set forth which is comparatively simple in its construction, strong, durable, compact, thoroughly efficient in its use, readily installed with respect to a ground cultivating means for the purpose of following the latter, quickly repaired when occasion requires and comparatively inexpensive to manufacture.

To the above ends essentially and to others which may hereinafter appear, the invention consists of such parts, and such combination of parts which fall within the scope of the invention as claimed.

In the drawing:—

Figure 1 is a top plan view of the mulcher.

Figure 2 is a fragmentary view in side elevation and upon an enlarged scale of the mulcher and further showing it clamped to the standard of a cultivator shovel.

Figure 3 is a fragmentary view in top plan and upon an enlarged scale showing the forward end of the mulcher clamped to the standard of a cultivator shovel.

Figure 4 is a fragmentary view in rear elevation and partly in section and upon an enlarged scale of a mulching element.

Figure 5 is a side elevation of a modified form of coupling connection for a mulching element.

A mulcher, in accordance with this invention, includes an attaching device 1 for clamping to the standard 2 of the shovel of a cultivator, a pair of adjustable carriers 3, 4, an adjustable coupling device 5 common to said carriers and extended rearwardly from said device 1, a pair of mulching elements 6, 7 and a pair of attaching devices 8, 9 for connecting the elements 6, 7 respectively to the carriers 3, 4 respectively.

The attaching device 1 includes an oblong metallic strap 10 of any suitable width, length and thickness and which is formed lengthwise thereof with a row of spaced openings 11. The openings are for the selective passage of the pair of arms 12 of a clamping yoke 13. The arms 12 are threaded as at 14. Carried by the arms 12 are clamping nuts 15. The strap 10 is of a length materially greater than the width of yoke 13. The strap 10, yoke 13 and nuts 15 provide for clamping the device 1 to the standard 2. One end of strap 10 is formed with an annular extension or loop 16 arranged in alignment with the longitudinal median thereof. The extension is offset with respect to the side faces of strap 10.

The carriers 3, 4 are of like construction, and but one will be described, as the description of one will apply to the other. The carriers 3, 4 are disposed at opposite inclinations and are adjustable relatively to each other and they are also adjustable at an angle to and rearwardly of the coupling device 5. Each carrier consists of a bar 17 of the desired length provided with a flattened forward end terminal portion 18 formed with an opening 19. The inner face of portion 18 is rabbeted as at 20 and the shoulder provided thereby beveled as at 21. The portions 18 of the carriers are arranged in superposed spaced relation and are adjustably connected upon the rear end of the coupling device 5. The rabbets on the inner faces of portions 18 are oppositely disposed with respect to each other.

The coupling device 5 includes a yoke 22 extended forwardly from and having its arms 23 integral, at diametrically opposite points with the outer face of a sleeve 24. The yoke 22 is loosely connected to the extension or loop 16. The sleeve 24 has a lateral opening 24' with its wall threaded. Extending into sleeve 24 and held therein by a binding screw 25 is a combined supporting and attaching member 26 which has the forward portion thereof extending into and conforming in contour to the inner face of sleeve 24. The screw 25 threadedly engages with the wall of opening 24'. The rear portion 27 of member 26 is flattened and formed with an opening 28. Seated upon portion 27 of member 26 is the outer face of the forward end portion of the carrier 4 and mounted upon such forward end portion is a locking washer 29 having one face toothed and its other face rabbeted. Engaging with the washer 29 is a locking washer 30 having one of its faces toothed and its other face rabbeted. The toothed faces of the washers interengage with each other. The rabbeted face of washer 29 is oppositely disposed with respect to and seats upon the rabbeted inner face of the forward end terminal portion of carrier 4. The rabbeted face of washer 30 is oppositely disposed with respect to and bears against the rabbeted inner face of the forward end terminal portion of carrier 3. The arrangement referred to prevents the shifting of the carriers relative to the washers, the washers relatively to each other and to the carriers when the end portions 18 and washers are clamped together. Extending through member 26, end portions 18 and washers 29, 30 is a clamping bolt 31 having a head abutting member 26. A clamping nut 32 is mounted on bolt 31 which bears against the end portion 18 of carrier 3.

The mulching elements 6, 7 are of like construction, and but one will be described, as the description of one will apply to the other. Each of said elements comprises a bar 33 of the desired length which is formed with a set of spaced transverse openings 34. Extending through each opening 34 is a horizontal toothed coupling bolt 35 having a hollow polygonal shaped head 36 through which extends a reversible vertically disposed mulching tooth 37, the latter having the major portion of its length conforming in contour to that of head 36 and by way of example is of rhombic contour. One end of the tooth 37 is pointed, as at 38 and its other end of spoon-like form as at 39. The tooth 37 snugly fits the head 36. Carried by the bolt 35 and abutting bar 33 is a clamping nut 40. Fixedly secured at its lower end, as at 41 is a standard 42 having its upper portion of circular cross section. Each mulching element is vertically and angularly adjustable with respect to its carrier.

The attaching devices 8, 9 provide for adjustably connecting the elements 6, 7 to the carriers 3, 4 respectively. As the attaching devices are of like construction, but one will be described, as the description of one will apply to the other. Each attaching device includes a split sleeve 42' which is clamped by holdfast means 43 to and extends rearwardly from the rear end of the carrier. The sleeve 42' is formed with a rearwardly projecting offset extension 44 having an opening 45 and a toothed inner face 46. Interengaging with the face 46 is the toothed face of a washer 47 formed with a semi-circular recess 48. Extending through washer 47 and extension 44 is an eye bolt 49 carrying a clamping nut 50 which abuts the non-toothed face of extension 44. The eye 51 of bolt 49 extends into the recess 48 and is mounted on standard 42. Washer 47 has its non-toothed face formed with a semi-circular groove 52 in which is clamped the standard 42 after being adjusted.

Figure 5 illustrates a modified form of attaching device which permits for the adjusting of a mulching element upon a horizontal pivot provided by an eye bolt 53, which extends through a globular member 54, seated in a socket 55 formed in an offset arm 56, at the rear end of a split sleeve 57 clamped to and extended rearwardly from a carrier. The member 53 has a curved seat 58 for standard 42. A clamping nut 59 is carried by bolt 53. The standard 42 extends through the eye of bolt 53 and is clamped to member 54 after being adjusted.

The circular portion of standard 42 is of less diameter than the eye of bolt 49 or 53.

The attaching device 1 is adjustable relative to standard 2. The coupling device 5 is loosely connected to the device 1 and member 26 of device 5 is adjustable relative to sleeve 24. The carriers 3, 4 are angularly adjustable with respect to each other and also relative to device 5. The mulching elements are angularly adjustable relative to each other and also with respect to the carriers and devices 8, 9.

What I claim is:—

1. In a mulcher, a pair of carriers angularly adjustable with respect to each other, said carriers having their rear ends offset and their forward ends arranged in superposed spaced relation, vertically and angularly adjustable mulching elements, attaching devices between said elements and one side of the offset rear ends of the carriers and including means for maintaining said elements in adjusted position, and a connecting structure between the forward ends of the carriers and a ground working device and including means for maintaining said carriers in adjusted position, said connecting structure being provided intermediate its ends with a pair of permanently loosely connected parts.

2. In a mulcher, a pair of standards, a bar secured to the lower end of each standard, two sets of spaced teeth, means for connecting a set of teeth to each bar, a pair of carriers having their forward ends arranged in superposed relation, means for adjustably connecting a standard to one side of the rear end of a carrier, a coupling device common to the forward ends of the carriers for adjustably connecting the latter together, and means for attaching said device to a ground working device, said attaching means and coupling device having coacting parts for loosely connecting them together.

3. In a mulcher, a pair of carriers oppositely inclined with respect to each other and having their forward ends arranged in superposed relation, a pair of vertically and angularly adjustable oppositely disposed mulcher elements extending at an angle with respect to the rear ends of the carriers, means for adjustably and fixedly securing a mulcher element intermediate its ends to the rear end of a carrier, a coupling device common to the forward ends of said carriers, and means for loosely connecting said device to a ground working means.

4. In a mulcher, a pair of carriers oppositely inclined with respect to each other and having their forward ends arranged in superposed spaced relation, each of said carriers having an offset rear end formed with a transverse opening, a sleeve having a yoke extended forwardly therefrom, means for loosely connecting the yoke to a ground working device, adjustable means carried by the sleeve for supporting and adjustably connecting together the forward ends of said carriers, a pair of vertically and angularly adjustable elements, and means extending through said openings for connecting said elements in adjusted position to one side of said offset rear ends.

5. In a mulcher, an adjustable forwardly extending combined supporting and attaching member, a pair of horizontally adjustable carriers having superposed forward ends arranged over the rear end of said member, means in connection with the rear end of the said member for connecting the forward ends of the carriers to said member and for locking the carriers in adjusted position, said carriers having offset rear ends, a pair of horizontally adjustable mulcher elements including standards opposing one side of said offset rear ends, means encompassing said standards abutting and extending through said offset rear ends for connecting said elements to the carriers and for locking said elements in adjusted position, and means for coupling said member to a ground working device.

6. In a mulcher, a pair of horizontally adjustable oppositely inclined carriers having their forward ends arranged in superposed relation, said forward ends being oppositely rabbeted, a coupling structure including means coacting with the forward ends of said carriers for connecting to the coupling structure and for locking the carriers in adjusted position, means for loosely connecting said structure to a ground working device, a pair of horizontally adjustable oppositely inclined mulcher elements, and a coupling structure extended through the rear end of each carrier for connecting the said elements to the carriers and including means for locking said elements in adjusted position.

7. In a mulcher, a pair of horizontally adjustable oppositely inclined carriers having their forward ends arranged in superposed relation, each of said carriers being formed with a sleeve at the rear thereof, each sleeve having an offset rear end, a coupling structure including means coacting with the forward ends of the carriers for connecting to the coupling structure and for locking the carriers in adjusted position, means for connecting said structure to a ground working device, a pair of horizontally adjustable oppositely inclined mulcher elements, and a coupling structure extending through each of said offset rear ends for connecting said elements intermediate their ends against one side of the carriers and for locking said elements in adjusted position.

In testimony whereof, I affix my signature hereto.

JAMES LESSIG.